United States Patent [19]

Bauer

[11] Patent Number: 4,928,984
[45] Date of Patent: May 29, 1990

[54] STEERING SYSTEM FOR TRACKING OF WHEELS

[76] Inventor: John K. Bauer, 510 Lenox Ave., Miami Beach, Fla. 33139

[21] Appl. No.: 363,680

[22] Filed: Jun. 9, 1989

[51] Int. Cl.$^5$ .............................................. B62D 7/00
[52] U.S. Cl. .................................................. 280/95.1
[58] Field of Search ...................... 280/95.1, 846, 772, 280/103, 112.2, 267, 269

[56] References Cited

U.S. PATENT DOCUMENTS

| | | | |
|---|---|---|---|
| 638,331 | 12/1899 | Grant | 280/95.1 |
| 1,058,758 | 4/1913 | Kennedy | 280/95.1 |
| 1,556,531 | 10/1925 | McMillin | 280/95.1 |
| 2,689,747 | 9/1954 | Kolbe | 280/112 |
| 2,852,268 | 9/1958 | Johnson | 280/95 |
| 4,159,128 | 6/1979 | Blaine | 280/772 |
| 4,515,380 | 5/1985 | Schumacher | 280/93 |

FOREIGN PATENT DOCUMENTS

| | | | |
|---|---|---|---|
| 318897 | 10/1902 | France | 280/95.1 |
| 286302 | 2/1953 | Switzerland | 280/95.1 |

*Primary Examiner*—Kenneth R. Rice
*Attorney, Agent, or Firm*—Thomas Schneck

[57] ABSTRACT

A motor vehicle steering system having first and second linkage assemblies, each pivotally coupled to a steerable wheel to exert simultaneous pushes or pulls, depending upon the direction of a vehicle turn. The first linkage assembly has an inboard end which is pivotally coupled to a first T-shaped track-inducing member which is connected to the steering box of the vehicle. The second linkage assembly is connected to a second T-shaped track-inducing member. Ends of the track-inducing members opposite to the linkage assemblies are joined by an arm. Rotation of a vehicle steering wheel causes the first track-inducing member to rotate about a vertical axis defined by the steering box. The joinder of the track-inducing members results in displacements of the inboard ends of the linkage assemblies. Because the connections at the opposed ends of each track-inducing member are out of phase by less than 180°, displacements of the linkage assemblies along an axis parallel to the side-to-side extension of the vehicle are dissimilar, and both the first and second steerable wheels track the turn center of the vehicle.

17 Claims, 1 Drawing Sheet

STEERING SYSTEM FOR TRACKING OF WHEELS

DESCRIPTION

1. Technical Field

The present invention relates generally to steering systems and particularly to steering systems for the tracking of steerable wheels during a turn.

2. Background Art

During negotiation of a turn, a motor vehicle forms an arc about a center of rotation as the steerable wheels of the vehicle are pivoted. Because the steerable wheels are spaced apart laterally, the outside wheel traces a larger radius circle than the inside wheel. Thus, only one wheel of a pair of wheels on opposite sides of a vehicle can be aligned with a radius of the vehicle turn center when both wheels are pivoted equal degrees.

A tire which "tracks" a turn center is one which is aligned with a radius of the turn center. Tire tracking is desirable since it directly affects the tire adhesion, thereby improving both the handling and the feel of the vehicle. A tire which does not track a turn center experiences tire slip. Tire slip prematurely deteriorates a tire and leads to tire slide and, when excessive, loss of control of the vehicle.

Tires which are not in tracking alignment will also adversely affect the wear of suspension components. The factors which lead to tire slip produce a stress not only on the bead wires and side walls of the tire, but also upon pivot assemblies and other components of the vehicle suspension.

Ideally, laterally spaced steerable wheels are turned unequal degrees so that each wheel is tangent to the respective turning circle and each axis of wheel rotation is directed at the center of a vehicle turn. Therefore, in the ideal situation, the outside wheel must be pivoted to a lesser degree than an inside wheel.

Steering and suspension systems which provide some degree of tracking are known. Such tracking systems, however, are typically compromises between complete tracking and other effects. Also known are steering and suspension systems for banking of steerable wheels to find a motion center point above the level of the car. Such systems are taught in U.S. Pat. No. 4,159,128 to Blaine, U.S. Pat. No. 2,852,268 to Johnson, U.S. Pat. No. 2,689,747 to Kolbe and U.S. Pat. No. 1,556,531 McMillin. These banking systems decrease the strain upon tires and suspensions, but alone the banking systems do not cause a pair of steerable wheels to track a turn center. Blaine, for example, teaches that an "outside" wheel in a turn must be banked, or tilted, to a greater degree than an "inside" wheel. Thus, the tilting of a wheel about a horizontal banking axis contrasts with the pivoting of a wheel about a vertical steering axis where an inside wheel must be pivoted to a greater extent in order to obtain tracking alignment.

An object of the present invention is to provide a steering system which causes a pair of laterally opposed steerable wheels to accurately track a turn center as a vehicle negotiates a turn. Another object is to provide such a steering system which can be retrofit to existing vehicles.

DISCLOSURE OF THE INVENTION

The above objects have been met by a steering system having members which compound displacement dissimilarities of wheel linkaging to provide complete tracking of a turn center. That is, the present invention includes a first assembly for pivoting an inside wheel to a greater degree than an outside wheel and includes a member to further exaggerate the differentiation, with the goal being one of providing perfect parallel tracking throughout the steering range.

The first assembly includes a first T-shaped track-inducing member which is connected to the pitman arm shaft of a steering box so that rotation of a vehicle steering wheel rotates the track-inducing member about a vertical axis. A motion transfer segment of the track-inducing member is parallel to the longitudinal axis of a vehicle during straight-line driving. A tie rod is attached to a first pivot coupling at one end of the motion transfer segment. At the opposite end of the motion transfer segment is a second pivot coupling which is attached to an arm. A pivot extension segment of the track-inducing member projects horizontally from the motion transfer segment to form the T-shape and to attach to the pitman arm shaft of the steering box. Thus, the ends of the motion transfer segment are less than 180° out of phase during rotation about the vertical axis and displacement of the end attached to the tie rod is dissimilar to the displacement of the end attached to the arm.

The tie rod attachment to the motion transfer segment is at the inboard end of a tie rod which has an outboard end that exerts a turning force on a steering rod of a first wheel. The dissimilar displacements created by the track-inducing member cause a degree of pivot of the first steerable wheel which is different than the degree of pivot of a laterally opposed steerable wheel.

The variations in degrees of pivot, moreover, are exaggerated by a second T-shaped track-inducing member. This second member includes a motion transfer segment which is parallel to the first member during straight-line driving. The forward ends of the two motion transfer segments are connected by the arm. A tie rod extending from the steering rod of a second wheel has an inboard end pivotally coupled to the rearward end of the second track-inducing member. Again, the ends of the motion transfer segment are less than 180° out of phase during rotation about a vertical axis. The track-inducing members act together to pivot an inside wheel of a turn to a greater extent than an outside wheel.

An advantage of the present invention is that both of a pair of steerable wheels track a turn center. The two tie rods are equal in length to act against undesired toe-in and toe-out fluctuations. Moreover, the tie rods attach to the track-inducing member at pivot points in alignment with the pivot shafts of control arms of the vehicle. This alignment of pivoting further promotes elimination of undesired toe-in and toe-out fluctuations. Tracking of a turn center improves maneuverability and control of a vehicle as tire slip is reduced. Reduction of tire slip also decreases the stress on tires and suspension components. Another advantage of the present invention is that the first track-inducing member is connected directly to the steering box, thereby facilitating retrofit of the steering system to existing structures.

BEST MODE FOR CARRYING OUT THE INVENTION

Figure 1:
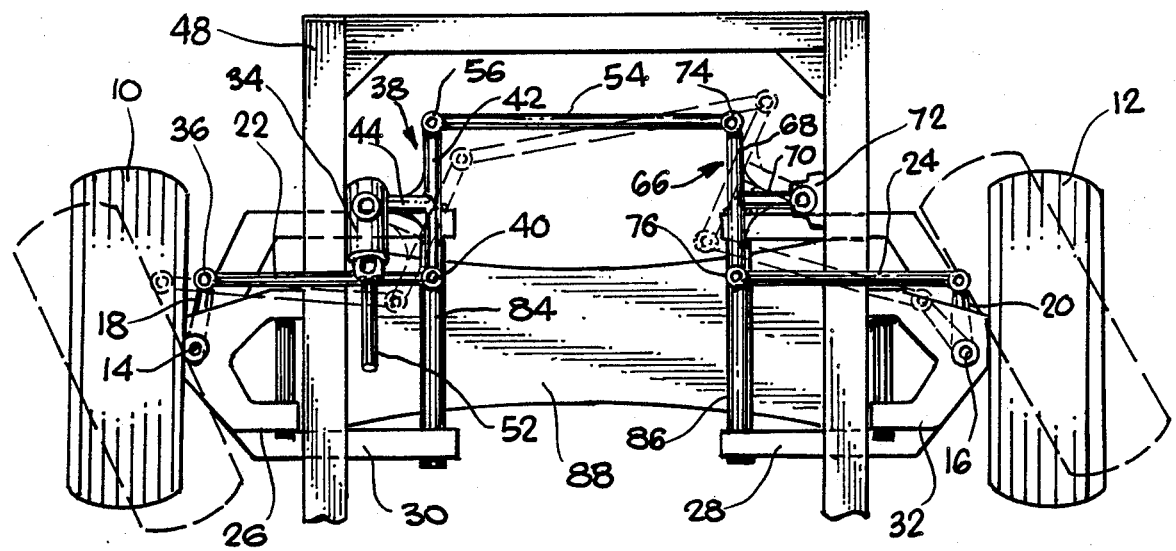
FIG. 1 is a fragmentary top view of a steering and suspension system of a motor vehicle in accord with the present invention.

With reference to FIG. 1, a vehicle steering system is shown for pivoting a left steerable wheel 10 and a right steerable wheel 12. Each wheel 10 and 12 is associated with a conventional steering assembly that includes a kingpin 14 and 16, a steering rod 18 and 20, and a tie rod 22 and 24. Also conventional are the lower control arms 26 and 28 and upper control arms 30 and 32.

As will be explained more fully below, the tie rods 22 and 24 are operatively coupled to a steering box 34 so that rotation of a vehicle steering wheel causes generally opposed motion of the tie rods. The tie rod 22 associated with the left steerable wheel 10 has an outboard end connected to the steering rod 18 at a ball and socket joint 36. At the inboard end, the tie rod 22 is connected to a T-shaped track-inducing member 38. The connection of the track-inducing member 38 to the inboard end of the tie rod 22 is provided by a pivot coupling 40.

Figures 2, 3:
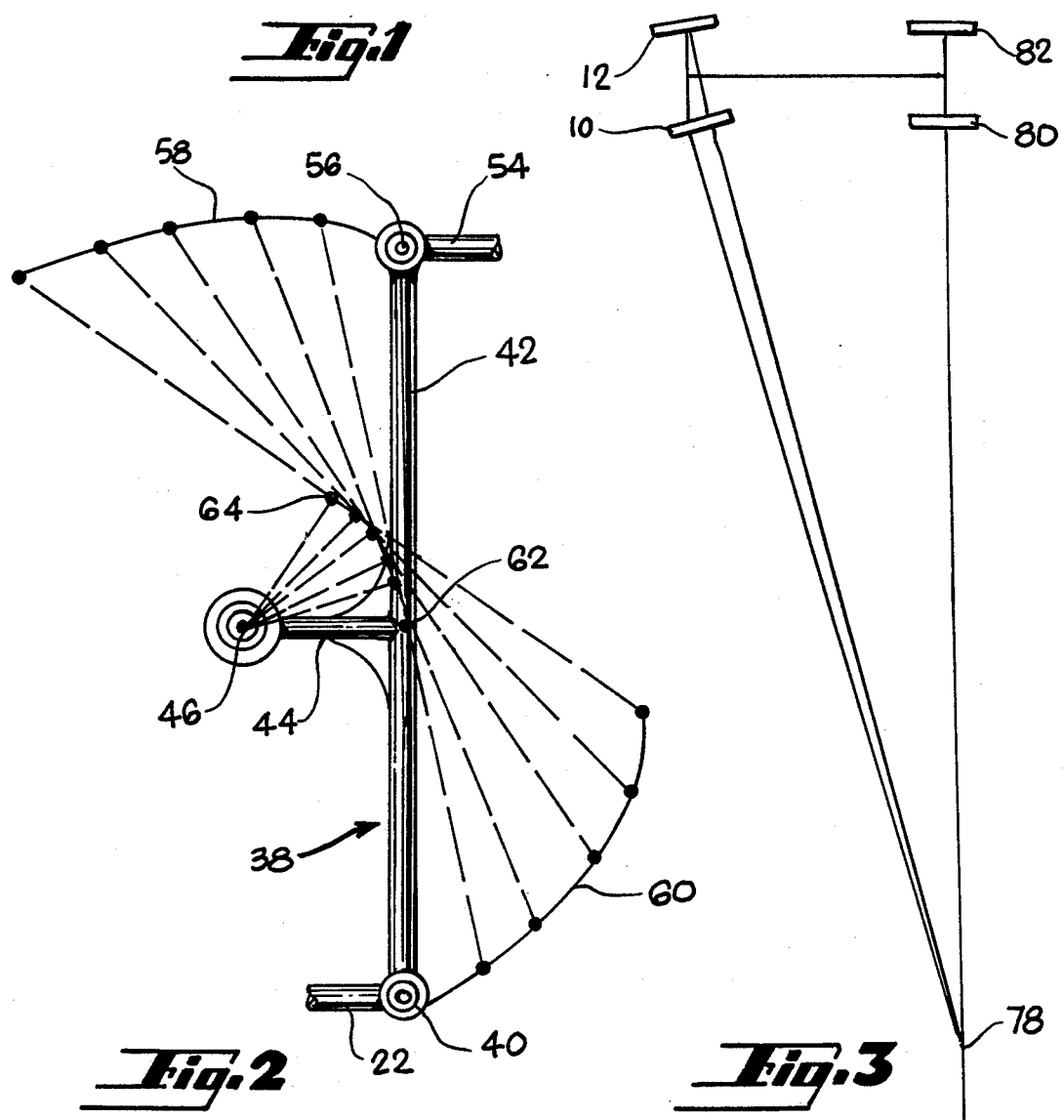
FIG. 2 is a top view of a track-inducing member of FIG. 1.
FIG. 3 is a diagrammatic top view of a motor vehicle executing a turn utilizing the steering system of FIG. 1.

Now referring to FIGS. 1 and 2, the track-inducing member 38 comprises a motion transfer segment 42 and a pivot extension segment 44 which is perpendicular to the motion transfer segment. The pivot extension segment 44 is attached to a pitman arm shaft 46 of the steering box 34. The steering box is fixed to a vehicle frame 48 by bolts, not shown. Manipulation of a vehicle steering wheel, not shown, causes rotation of a steering column 52 which is forked at a lower end and connected to the steering box. The steering box is a conventional device having a worm gear which translates clockwise or counterclockwise rotation of the vehicle steering wheel into an opposite rotation of the pitman arm shaft 46. That is, counterclockwise rotation of a vehicle steering wheel causes clockwise rotation of the track-inducing member 38.

During straight-line driving, the left tie rod 22 is parallel to a coupling arm 54 joined to the motion transfer segment 42 of the track-inducing member 38 by a pivot coupling 56. However, during negotiation of a turn, the tie rod 22 and coupling arm 54 are no longer parallel. A phantom illustration of a left turn is shown in FIG. 1 to demonstrate the position of parts. In the phantom illustration of the left turn, the angle formed by the tie rod 22 and the motion transfer segment 42 is significantly less than the angle formed by the coupling arm 54 and the motion transfer segment. In like manner, there is a dissimilarity in displacement of the tie rod 22 and the coupling arm 54 relative to an X-axis that is defined by the transverse extension of the vehicle frame 48.

The method of achieving a greater displacement of the tie rod 22 relative to the coupling arm 54 along the X-axis is best illustrated in FIG. 2. As noted above, manual rotation of a vehicle steering wheel causes the T-shaped track-inducing member 38 to undergo an opposite rotation. Thus, the forward pivot coupling 56 follows the arc 58, while the rearward pivot coupling 40 follows the arc 60. The arcs 58 and 60 are portions of a circle about the rotational axis defined by the pitman arm shaft 46. The pivot extension segment 44 of the track-inducing member 38 is attached at the midpoint 62 between the opposed pivot couplings 40 and 56. During the right turn illustrated in FIG. 2, the midpoint 62 is moved away from the right steerable wheel of a vehicle as counterclockwise rotation takes place during the turn. Maneuvering of the vehicle steering wheel moves the midpoint 62 through the sequence indicated in FIG. 2 until the position 64 is reached. With the midpoint 62 moving away from the right side of the vehicle, the pull on the coupling arm 54 at the joint 56 is greater than the pull on the tie rod 22 at the joint 40. Consequently, a tire controlled by motion of the coupling arm 54 pivots to a greater extent than a tire controlled by the tie rod 22. The opposite effect is experienced during return to straight-line driving and during execution of a left turn, as shown in FIG. 1. The T-shaped track-inducing member 38 rotates clockwise during a left turn, and because the midpoint between the pivot couplings 40 and 56 moves toward the left steerable wheel 10, the tie rod 22 associated with the left steerable wheel provides a greater push than the push provided by the coupling arm 54 associated with the right steerable wheel. For both left and right turns, therefore, the inside wheel is steered a greater degree than the outside wheel.

Another way of analyzing the same effect is to look to the arcs 58 and 60 followed by the pivot couplings 40 and 56 in FIG. 2. In the initial straight-line driving position shown in FIG. 2, the pivot-extension segment 44 may be considered as defining an X-axis. The relevant Y-axis is parallel to the motion transfer segment 42 and cuts through the pitman arm shaft 46 which defines the vertical axis of rotation. In following the arcs 58 and 60, the pivot couplings 40 and 56 are significantly less than 180° out of phase. Thus, the pivot couplings have dramatically different X and Y components of motion as the pivot couplings sweep along the respective arcs. The right turn illustrated by the arcs in FIG. 2 shows that the forward arc 58 has a much greater range along the X-axis in the direction of the left side of a vehicle than does the arc 60 in the direction of the right side of the vehicle. In a straight-line driving position, the pivot coupling 40 has already swept through that portion of the arc which maximizes motion in the direction of the right side of the vehicle. In contrast, the forward pivot coupling 56 is in the position to maximize the lateral movement of the associated coupling arm 54. As a result, the right turn causes a greater pull of the coupling arm 54 than the pull on the tie rod 22.

While the relevant arcs are not shown in FIG. 2, a left turn has the same effect as described above. The rearward pivot coupling 40 is in a position to maximize the movement along the X-axis during negotiation of the left turn. The forward pivot coupling 56, on the other hand, has a comparatively high range of motion along the Y-axis but a low range along the X-axis. Again, the inside wheel of a turn is steered to a greater degree.

It has been discovered that the dissimilarities in displacement of the left tie rod 22 and the coupling arm 54 along the X-axis, is insufficient to provide a true track of a turning center throughout the steering range. For this reason, a track-inducing member 66 is included at the right side of the vehicle. The second track-inducing member 66 functions in the same manner as the above-described member 38, having a motion transfer segment 68 and a pivot extension segment 70. The end of the pivot extension segment opposite to the motion transfer segment is pivotally connected to a bracket 72 affixed to the vehicle frame 48. A forward pivot coupling 74 and a rearward pivot coupling 76 at opposed ends of the motion transfer segment are significantly less than 180° out of phase with respect to rotation of the track-inducing member 66 at the bracket 72. Thus, as described above, there is a dissimilarity of displacements of the two pivot couplings 74 and 76 along the X-axis as the vehicle negotiates a turn. For example, in the turn illustrated in phantom in FIG. 1, offset rotation of the first motion transfer arm 42 causes a greater displacement of the left tie rod 22 than the coupling arm 54. This dissimilarity of displacement of left and right linkage members is increased by the offset rotation of the second motion transfer segment 68. The rearward pivot coupling 76 is in a position to maximize motion along the X-axis during a right turn, but in the phantom left turn of FIG. 1, there is a comparatively high range of motion along the Y-axis rather than along the X-axis.

Thus, the track-inducing members 38 and 66 combine to provide sufficient dissimilarities of wheel pivot. As shown in FIGS. 1 and 3, the left turn about a turn center 78 is executed with the steerable wheels 10 and 12 being turned dissimilar degrees to track the turn center. In order for both wheels 10 and 12 to track the turn center 78, it is necessary that the inside wheel of the turn pivot to a greater degree than the outside wheel. Proper tracking occurs only when the rotational axes of all four wheels 10, 12, 80 and 82 intersect at the turn center 78. The present invention permits a precise tracking throughout the range of steering permitted by maneuvering of the steering column 52.

In operation, a first dissimilarity of displacement along the X-axis is produced by the left track-inducing member 38, and a second dissimilarity is produced by the right track-inducing member. The track-inducing members are each rotated about a vertical axis which is aligned with the inboard extension of the associated lower control arm 26 and 28. The lower control arms are mounted on shafts 84 and 86 which are fixed to a cross member 88 to permit relative movement between the control arms and the vehicle frame 48. Equidistantly spacing an inboard end of a lower control arm 26 and 28 with the pivot axis of the associated tie rod 22 and 24, promotes elimination of undesired toe-in and toe-out fluctuations.

While the present invention has been illustrated as having track-inducing members 38 and 66 which have pivot extension segments 44 and 70 that are equal in length, this is not critical. However, the combined length of the two pivot extension segments is critical to proper tracking of a specific vehicle, so that after determination of the combined length a shortening of one pivot extension segment must be accompanied by a corresponding lengthening of the other. Moreover, the left and right tie rods 22 and 24 should be of equal length to guard against undesired toe-in fluctuations.

I claim:

1. A steering system for a vehicle having a frame and a pair of axially aligned steerable wheels supported on laterally opposed sides of the frame comprising, first and second linkage assemblies for exerting a turning force on steerable wheels of a vehicle, each linkage assembly having an inboard end and an outboard end and being substantially parallel to the other during straight-line driving, said outboard end of the first linkage assembly coupled to a first steerable wheel and said outboard end of said second linkage assembly coupled to a second steerable wheel, a first track-inducing member having horizontally extending motion transfer and pivot extension segments, said motion transfer segment having spaced apart first and second pivot couplings, said first pivot coupling being attached to said inboard end of the first linkage assembly, said pivot extension segment extending from between said pivot couplings and attaching to said vehicle for rotation about a first vertical axis spaced apart from said motion transfer segment, a third linkage assembly having opposed extremities, with one extremity attached to said second pivot coupling, a second track-inducing member having horizontally extending motion transfer and pivot extension segments, said motion transfer segment having spaced apart third and fourth pivot couplings, said third pivot coupling being attached to the extremity of said third linkage assembly opposite said second pivot coupling, said fourth pivot coupling being attached to the inboard end of the second linkage assembly, said pivot extension segment extending from between said third and fourth pivot couplings and attached to said vehicle for rotation about a second vertical pivot axis spaced apart from said first, and manually operated steering means for rotating said first track-inducing member about said first vertical axis, said rotation of the first track-inducing member causing rotation of said second track-inducing member via said third linkage assembly, said track inducing members providing dissimilar lateral displacements of said first and second linkage assemblies.

2. The steering assembly of claim 1 wherein said steering means includes a steering box and wherein said pivot extension segment of the first track-inducing member is connected to said steering box, said steering box defining said first vertical axis.

3. The steering system of claim 2 wherein said first and second linkage assemblies are of substantially equal length.

4. The steering system of claim 3 wherein said steerable wheels are positioned along a horizontal axis of wheel rotation, said outboard ends of said first and second linkage assemblies being forward of said horizontal axis.

5. The steering system of claim 1 wherein said first and second linkage assemblies each include tie rods.

6. The steering system of claim 1 wherein said third linkage assembly is a horizontally extending coupling rod.

7. The steering system of claim 1 wherein said first and second track-inducing members each a T-shaped configuration.

8. A steering system for a vehicle having a frame and a pair of steerable wheels supported from laterally opposed sides of the frame, said frame having a front-to-rear extension defining a Y-axis and a side-to-side extension defining an X-axis, said steering system comprising, a pair of horizontally spaced track-inducing members, each connected to a vehicle for pivoting relative to a frame of said vehicle and each having a motion transfer segment and having a pivot extension segment projecting from a midsection of said motion transfer segment to define a T-shaped configuration, said track-inducing members each having a straight-line driving condition wherein said motion transfer segments are parallel a Y-axis defined by said vehicle frame and wherein said pivot extension segments extend in opposite directions from said motion transfer segments to said connection to the vehicle, each motion transfer segment having a first and a second pivot coupling on opposed sides of said midsection, a linkage joining said second pivot couplings of the track-inducing members, a manually operated steering means having a steering box, a pivot extension segment of one of said track-inducing members being connected to said steering box such that said operation of said steering means rotates said pivot extension segment about an axis defined by said steering box, said one of said track-inducing members being a first track-inducing member, a first linkage assembly having an outboard end connected to a first steerable wheel and an inboard end connected to said first pivot coupling of said first track-inducing member, and a second linkage assembly having an outboard end connected to a second steerable wheel and an inboard end connected to the first pivot coupling spaced apart from said first linkage assembly, whereby said operation of the steering means pivots said first track-inducing member, causing unequal lateral displacements of the first linkage assembly and second pivot couplings parallel to an X-axis defined by said vehicle frame, the other track-inducing member being simultaneously pivoted via said linkage of said second pivot couplings so as to provide a second unequal displacement parallel to said X-axis, said second unequal displacement being an inequality of lateral displacement of said second linkage assembly and said second pivot couplings.

9. The steering system of claim 8 wherein said inboard ends of said first and second linkage assemblies are substantially equidistant from the steerable wheel associated with the respective linkage assembly.

10. The steering system of claim 9 wherein said linkage assemblies each include a tie rod.

11. The steering system of claim 10 wherein said steerable wheels are aligned along a horizontal axis and wherein said tie rods are both disposed on one of the forward side and the rearward side of said horizontal axis.

12. The steering system of claim 8 wherein said linkage joining said second pivot couplings is a coupling arm.

13. A steering system for a vehicle having a frame and a pair of axially aligned steerable wheels supported on laterally opposed sides of the frame comprising, first and second linkage assemblies for exerting a turning force on steerable wheels of a vehicle, each linkage assembly having an inboard end and an outboard end and being substantially parallel to the other during straight-line driving, said outboard end of the first linkage assembly coupled to a first steerable wheel and said outboard end of the second linkage assembly coupled to a second steerable wheel, said linkage assemblies including a tie rod, said tie rods being of equal length and being disposed on one of the forward and rearward sides of the rotational axes of said steerable wheels, a first T-shaped track-inducing member having horizontally extending motion transfer and pivot extensions, said motion transfer segment having spaced apart first and second pivot couplings, said first pivot coupling being attached to said inboard end of the first linkage assembly, said pivot extension segment extending from between said pivot couplings and attaching to said vehicle for rotation about a first vertical axis spaced apart from said motion transfer segment, a third linkage assembly having opposed extremities, with one extremity attached to said second pivot coupling, a second T-shaped track-inducing member having horizontally extending motion transfer and pivot extension segments, said motion transfer segment having spaced apart third and fourth pivot couplings, said third pivot coupling being attached to the extremity of said third linkage assembly opposite to said second pivot coupling, said fourth pivot coupling being attached to the inboard end of the second linkage assembly, said pivot extension segment extending from between said third and fourth pivot couplings and attaching to said vehicle for rotation about a second vertical axis spaced apart from said first, and manually operated steering means for rotating said first track-inducing member about said first vertical axis, said steering means having a steering box coupled to said first track-inducing member, said steering box defining said first vertical axis, said rotating of the first track-inducing member providing rotation of said second track-inducing member via said third linkage assembly, said track-inducing member rotations causing dissimilar lateral displacements of said first and second linkage assemblies.

14. The steering system of claim 13 wherein said vehicle frame has a longitudinal extension defining a Y-axis and a transverse extension defining an X-axis, said motion transfer segments being substantially parallel to said Y-axis when said steerable wheels are in a straight-line driving condition.

15. The steering system of claim 14 wherein said pivot extension segments extend in opposite directions from the respective motion transfer segment.

16. The steering system of claim 13 wherein said dissimilar displacements of said first and said second linkage assemblies pivot a steerable wheel radially inward of a vehicle turn to a greater extent than the other steerable wheel.

17. The steering system of claim 13 wherein said pivot extension segments are equal in length.

* * * * *